United States Patent [19]
Blakeslee et al.
[11] 3,737,739
[45] June 5, 1973

[54] SINGLE CRYSTAL REGIONS IN DIELECTRIC SUBSTRATE

[75] Inventors: A. Eugene Blakeslee, Mount Kisco; Thomas F. Gukelberger, Jr., Hopewell Junction; Vincent J. Lyons, Poughkeepsie, all of N.Y.

[73] Assignee: International Business Machines Corporation, Armonk, N.Y.

[22] Filed: Feb. 22, 1971

[21] Appl. No.: 117,474

Related U.S. Application Data

[62] Division of Ser. No. 697,770, Jan. 15, 1968.

[52] U.S. Cl. .........317/235 R, 317/234 H, 317/235 F, 317/235 AQ
[51] Int. Cl. ..............................................H01l 5/00
[58] Field of Search ..................317/234, 235, 235 F, 317/235 AQ

[56] References Cited

UNITED STATES PATENTS

| | | | |
|---|---|---|---|
| 3,473,976 | 10/1969 | Castrucci et al. | 148/175 |
| 3,433,686 | 3/1969 | Marinace | 317/235 |
| 3,133,336 | 5/1964 | Marinace | 29/25.3 |
| 3,386,864 | 6/1968 | Silvestri et al. | 148/175 |
| 3,425,879 | 4/1969 | Shaw et al. | 148/175 |
| 3,482,149 | 12/1969 | Duke | 317/234 |
| 3,496,037 | 2/1970 | Jackson et al. | 148/175 |

*Primary Examiner*—John W. Huckert
*Assistant Examiner*—Joseph E. Clawson, Jr.
*Attorney*—Hanifin & Jancin and George O. Saile

[57] ABSTRACT

A structure having single crystal islands in a dielectric substrate is described. The substrate has recesses formed in its surface to receive the single crystal bodies therein. By applying a temperature gradient across each of the bodies throughout the entire heating cycle, nucleation occurs only at a bottom point on each of the bodies when a vapor containing the material to be nucleated is passed over the bodies with the material of the bodies being molten. The single crystalline material can be, for example, silicon or germanium and the dielectric material can be, for example, a silicon dioxide glass or a mixed oxide ceramic.

4 Claims, 8 Drawing Figures

INVENTORS
A. EUGENE BLAKESLEE
THOMAS F. GUKELBERGER JR.
VINCENT J. LYONS

BY George O. Saile
ATTORNEY

SINGLE CRYSTAL REGIONS IN DIELECTRIC SUBSTRATE

RELATED APPLICATIONS

This is a division of the patent application entitled "Single Crystals and Method of Growing Same" by Blakeslee, et al., Ser. No. 679,770, filed Jan. 15, 1968.

BACKGROUND OF THE INVENTION

1. Field of the Invention

In fabricating silicon integrated circuits, it is presently necessary to have a single crystal substrate to form the matrix for the integrated circuits. In order to have a single crystal substrate, it is necessary to grow a single crystal wafer and then divide the wafer by suitable means into a plurality of single crystal substrates. This is a relatively expensive procedure but it does produce a single crystal substrate.

Since only a small portion of the total area of the substrate is utilized for the integrated circuits formed therein, the growing of a single crystal substrate also results in a substantially greater use of silicon than is actually employed in forming the integrated circuits. Furthermore, after formation of the various integrated circuits within the substrate, it is necessary to electrically isolate the circuits from each other by suitable means such as a dielectric material or a p-n junction, for example.

2. Description of the Prior Art

The present invention satisfactorily solves the foregoing problem by providing a method for the selective growth of discrete single crystals of silicon in a non-monocrystalline substrate of a dielectric material. Thus, the method of the present invention not only eliminates the requirement for growing a single crystal substrate but also eliminates the need to electrically isolate the various integrated circuits from each other since the discrete single crystals of silicon are isolated from each other due to the material of the substrate, which may be either polycrystalline or amorphous.

Thus, the method of the present invention reduces the cost of forming integrated circuits by eliminating the requirement for a single crystal substrate within which the integrated circuits are formed. Since the integrated circuits actually comprise only a small portion of the total volume of the substrate, the method of the present invention substantially reduces the amount of silicon required.

Since the method of the present invention permits the crystals to be grown at temperatures substantially below the melting point of silicon (for example, 350°C–450°C below the melting point of silicon), the diffusivity of the impurity atoms is substantially reduced. Thus, better control of the impurity concentration in each of the crystals is obtained with the method of the present invention.

It has previously been suggested to grow a film of single crystal silicon on a ceramic substrate having a layer of glass thereon. This film growth does not provide any electrical isolation of the single crystals of siicon from each other as does the method of the present invention. Thus, the previously suggested method is not readily adaptable for use with integrated circuits without the extra expense of electrically isolating the various circuits from each other after formation thereof.

It also has been previously suggested to grow single crystals of silicon from an amorphous quartz substrate having a thin layer of gold thereover. This type of growth has not produced a selected growth of single crystals of silicon but has produced random growth thereof. The present invention overcomes this problem by specifically selecting where the growth of each of the single crystals of silicon will occur. Furthermore, the method of the present invention insures that nucleation occurs at only one point from a gold sphere whereby only a single crystal of silicon will be produced from each gold sphere. The previously suggested method is not capable of insuring that only a single crystal will result.

It also has previously been suggested to grow single crystals of silicon from a substrate of a single crystal of silicon with the use of a gold ball. This previously suggested method does not produce electrically isolated single crystals nor is there control of the growth of the crystal in a specific direction with only a single crystal being grown at each gold ball as in the method of the present invention. Additionally, this method requires the substrate to be a single crystal of silicon.

SUMMARY OF THE INVENTION

An object of this invention is to provide a method for growing single crystals in a polycrystalline or amorphous substrate.

Another object of this invention is to provide a method for controlling the nucleation of a material in a body of another material.

A further object of this invention is to provide a method for selectively growing discrete single crystals in openings or holes in a polycrystalline or amorphous substrate.

Still another object of this invention is to provide a plurality of single crystal members in a non-monocrystalline substrate.

A still further object of this invention is to provide a dielectric substrate of non-monocrystalline material with a plurality of single crystal members in which monolithic integrated circuits can be formed.

The foregoing and other objects, features, and advantages of the invention will be more apparent from the following more particular description of the preferred embodiments of the invention as illustrated in the accompanying drawings.

DESCRIPTION OF THE PREFERRED EMBODIMENTS

Figure 1:
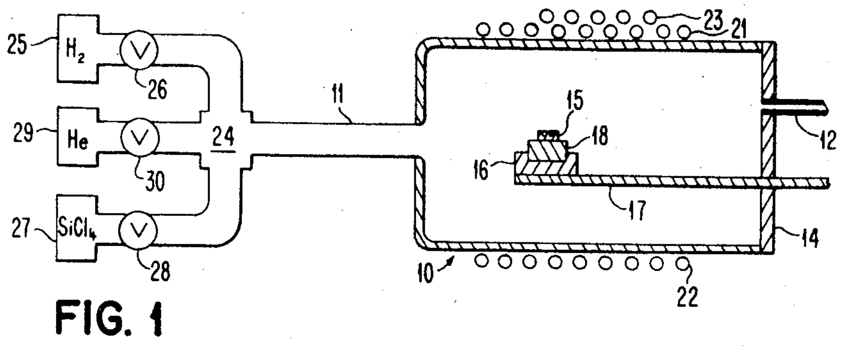
FIG. 1 is a schematic view of an apparatus for carrying out the method of the present invention.

Referring to the drawings and particularly FIG. 1, there is shown an apparatus for carrying out the method of the present invention. The apparatus includes a reactor tube 10, which is preferably formed of quartz, functioning as a furnace and providing a controlled atmosphere. A selected atmosphere is supplied to the interior of the tube 10 through an inlet tube 11 and exhausted therefrom through an outlet tube 12. The outlet tube 12 is mounted in a clOsure member 14, which seals the open end of the tube 10.

A non-monocrystalline substrate 15 is disposed within the interior of the tube 10 through being supported on a holder 16, which includes a handle 17 extending outwardly through the closure member 14 to permit control of the position of the substrate 15 within the tube 10. The holder 16 and the handle 17 are formed of a material that is non-chemically interacting with all of the elements within the tube 10 and the gases and vapors passing therethrough. The material of the holder 16 and the handle 17 could be quartz, alumina, or suitably coated graphite, for example.

The substrate 15 is preferably supported on the holder 16 through a plug 18, which functions as a heat drain. The plug 18 is formed of a material that is non-chemically interacting with the vapors passing through the tube 10. The plug 18 could be formed of silicon or suitably coated graphite, for example.

The substrate 15 may be formed of any polycrystalline or amorphous substance. For example, the amorphous substance may be quartz. Likewise, the polycrystalline substance could be a laminated ceramic material such as a metallic oxide. Examples of the metallic oxide are aluminum oxide and silicon dioxide. Furthermore, the substrate could be a mixed oxide ceramic such as a mixture of oxides of aluminum, silicon, and magnesium.

Figure 3:
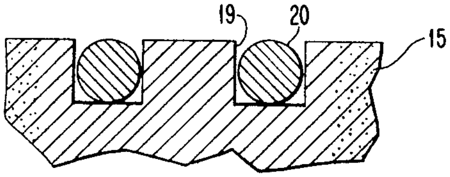
FIG. 3 is an enlarged sectional view of a portion of a non-monocrystalline substrate having gold spheres disposed in recesses therein.

The substrate 15 has a plurality of recesses 19 (see FIG. 3) formed in one surface thereof to receive metal spheres or balls 20 of a molten, binary alloy-forming element with the element to be introduced through the inlet tube 11 as a vapor into the interior of the tube 10. The two elements should be capable of forming liquid solutions having compositions from which a solid phase of the element, which is introduced into the tube 10 as a vapor, can be precipitated. When the vapor contains silicon, the sphere may be formed of gold, tin, zinc, or indium, for example.

The reactor tube 10 has a heating element 21 on its upper surface and a heating element 22 on its lower surface. The heating elements 21 and 22 are preferably separate from each other and are electric heating elements so as to be precisely controlled. By forming the elements 21 and 22 separate, regulation of each of the elements may be made independently.

An additional separate heating element 23 is disposed above the heating element 21. The heating element 23 may be an infrared or radiation heater, for example. Another example of the heating elements 23 is an electric wire wound around a semi-cylindrical tube.

The flow of gas and vapor into the interior of the tube 10 through the inlet tube 11 is from an intake manifold 24. The intake manifold 24 is connected with a source 25 of hydrogen gas with a valve 26 to control the flow of hydrogen from the source 25 to the intake manifold 24.

The intake manifold 24 also is connected with a source 27 of a vapor having the material from which the single crystals are to be formed. The source 27 may contain a silane such as tetrachlorosilane ($SiCl_4$), for example. The flow of the gas or vapor from the source 27 to the intake manifold 24 is controlled by a valve 28. The hydrogen serves as both a carrier for the tetrachlorosilane and as a reactant therewith.

The intake manifold 24 also is connected to a source 29 of an inert gas such as helium, for example, with a valve 30 to control the flow of the inert gas from the source 29 to the intake manifold 24. The inert gas functions as a purge for the interior of the reactor tube 10.

In examples of carrying out the method of the present invention, the substrate 15 was formed from various laminated ceramic material such as mixed metallic oxides of aluminum, silicon, zirconium, calcium, magnesium, strontium, barium, titanium, and iron. The substrates 15 also were formed from quartz.

The recesses 19 were formed in the substrate 15 with a cylindrical shape having a diameter of twelve mils and a depth of 5 to 10 mils. The spheres 20 were gold and had a diameter of 10 mils. Thus, the spheres 20 either had their upper surface substantially parallel with the surface of the substrate 15 in which the recesses 19 were formed or extended outwardly beyond the surface a distance no greater than the radius of the sphere 20. This insures cooperation between the wall of the recess 19 and the sphere 20 to limit any vapor flow therebetween toward the bottom of the recess 19. However, it should be understood that it is not necessary for the sphere 20 to extend into the recess 19 for any specific distance.

The plug 18 was formed of silicon while the holder 16 and its handle 17 were formed of quartz. The diameter of the interior of the reactor tube 10 was approximately 25 millimeters. After the substrate 15 was disposed within the reactor tube 10 and the closure member 14 sealed the open end of the tube 10 through which the substrate 15 was introduced, the valve 30 was opened to permit the inert gas, which was helium, from the source 29 to flow into the interior of the tube 10 through the inlet tube 11 and exit through the outlet tube 12 to purge the system.

After purging with helium, the valve 30 was closed and the valve 26 was opened. This stopped the flow of helium and started flow of hydrogen from the source 25 at a predetermined rate.

Then, the heating elements 21–23 were energized to provide a temperature gradient across the sphere 20 and substantially perpendicular to the surface of the substrate 15. The temperature at the bottom of the sphere 20 was approximately 1,063°C, which is the melting point of gold. Accordingly, the sphere of gold became molten.

Then, the valve 28 was opened to permit tetrachlorosilane to be introduced into the manifold 24 along with the hydrogen from the source 25. The valves 26 and 28 were adjusted so that the mole ratio of the tetrachlorosilane to the hydrogen was 0.001. The flow of this atmosphere with the mole ratio of 0.001 was continued for 30 minutes.

Then, the temperature at the bottom of the sphere 20 was reduced to 950°C and the mole ratio was increased to 0.02 by appropriately regulating the valves 26 and 28. This reaction was continued for approximately 1½ hours during which time a single crystal silicon was grown from the bottom of each of the gold spheres 20 through the sphere 20 and out the top thereof.

After this period of time, the valve 28 was closed to stop the flow of tetrachlorosilane. However, the flow of hydrogen was continued for a sufficient period of time to purge the system. Then, the heating elements 21–23 were turned off and the substrate 15 removed from the reactor tube 10.

Figure 2:
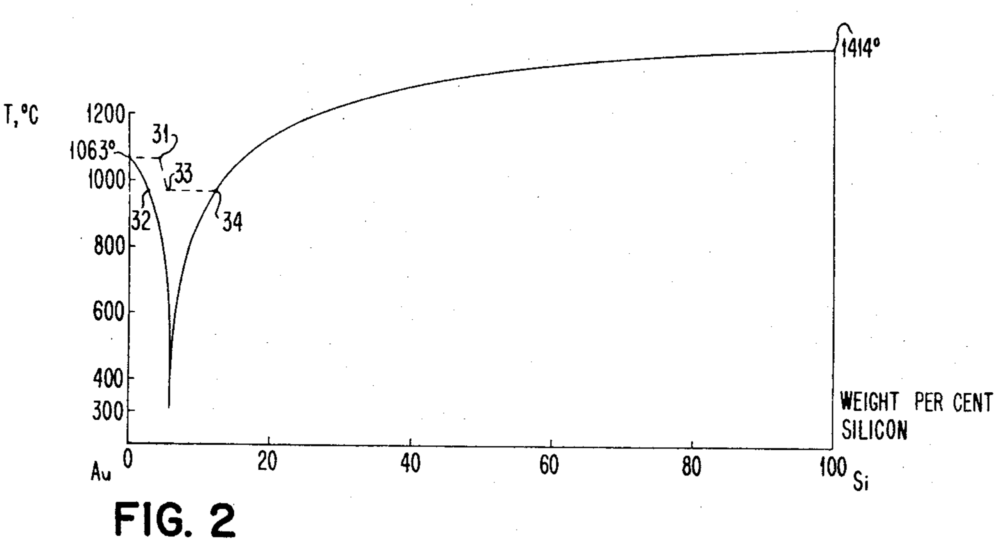
FIG. 2 is a phase diagram of the gold-silicon system.

As shown in FIG. 2, the reaction is continued at the temperature of 1,063°C until the amount of silicon in the gold sphere is in excess of the gold liquidus line composition at the temperature at which nucleation will occur to form the single crystal. Thus, as shown in FIG. 2, the process is continued at the higher temperature until a point 31, for example, is reached.

The point 31 indicates an alloy having a greater silicon percentage than occurs at point 32, which is the composition of silicon at 950°C. This meets the requirement of the silicon percentage being in excess of the gold liquidus line composition at the temperature at which growth is to occur. When the temperature is decreased to 950°C at the bottom of the sphere 20, the silicon percentage in the gold sphere 20 continues to increase to point 33, which is when the temperature reaches 950°C at the bottom of the sphere 20.

When the silicon concentration within the sphere 20 reaches point 34, the sphere 20 is saturated with silicon. Continued addition of silicon to the sphere 20 from the vapor phase results in a supersaturation of the sphere 20 with silicon, thus providing a necessary condition for nucleation of solid silicon to occur. A preferred heterogeneous nucleation site has been provided through the interfacial contact between the bottom of the sphere 20 and the substrate 15 at which point the supersaturation required for solid silicon nucleation is significantly lower than that required to produce solid silicon nuclei through homogeneous nucleation elsewhere within the sphere 20.

A further enhancement toward causing nucleation to occur only at the bottom of the sphere 20 is provided through the applied temperature gradient. One example of this temperature gradient is caused by maintaining 970°C at the top of the sphere 20 and 950°C at the bottom of the sphere 20. The higher temperature at the top of the sphere 20 will support a higher saturated silicon concentration in the liquid solution; thus, as the solution becomes supersaturated with silicon, the degree of supersaturation is less at the top of the sphere 20 than at the bottom of the sphere 20. Accordingly, a greater driving force toward nucleation is caused to occur at the bottom of the sphere 20. The combined directional control of temperature and sphere-substrate contact insures that nucleation occurs at only one point on the sphere 20.

Once nucleation of solid silicon crystal occurs, the growth of the crystal is controlled through the flow of silicon from the vapor phase through the liquid solution with assistance from the temperature gradient.

It should be understood that it is not necessary to start the method of the present invention with the initial temperature at the bottom of the sphere 20 at the melting temperature of gold. Instead, some lower temperature could be employed and the gold sphere 20 would become molten when the gold liquidus line was passed with the addition of silicon to the sphere 20. It would be necessary to insure that the operation at the higher of the selected temperatures would continue until the composition of the sphere 20 had a percentage of silicon therein greater than the composition of silicon on the gold liquidus line at the lower temperature at which nucleation is to occur. Of course, it is necessary that the lowest temperature of the sphere 20 be greater than the eutectic temperature (approximately 300°C) of the composition.

In addition to the temperature gradient influencing nucleation to occur at the bottom of the sphere 20, the interfacial surface tension is lower at the point on which the sphere 20 rests on the bottom wall of the recess 19 than at the top of the sphere 20. As a result, the lower interfacial surface tension also is a factor in insuring that nucleation occurs at the bottom of the sphere 20.

Furthermore, because of the high contact angle between the sphere 20 and the bottom of the recess 19, heterogeneous nucleation is localized to reduce the number of nuclei tending to form on the substrate 15. Thus, the high contact angle created by the sphere 20 insures that heterogeneous nucleation occurs at the bottom of the sphere 20.

When the temperature gradient is applied substantially perpendicular to the surface of the substrate 15, the silicon cyrstals grow substantially perpendicular to the surface of the substrate 15 since they grow in the direction of the temperature gradient. Therefore, if the temperature gradient across the gold sphere 20 should be applied at an angle, than the crystal would grow at this angle.

The final crystal of silicon has approximately 0.0001 percent of gold in the previously given examples. This amount of gold can be desirable to limit carrier lifetime, for example. If it is desired that this gold be removed, it may be removed by a suitable process such as the blotter technique, for example.

Theoretically, the temperature at the bottom of the gold sphere 20 could be any temperature above the eutectic temperature of the gold-silicon alloy and below the melting point of silicon to produce single crystal silicon; however, a practical temperature operating range is between 600°C and 1,200°C. Furthermore, the temperature gradient across the gold spheres 20 must be greater than 50°C per centimeter of vertical displacement in the reactor tube 10 with this temperature gradient being determined while flowing hydrogen through the reactor tube 10 at the rate of 1 liter per minute before the substrate 15 is disposed in the tube 10.

Figure 4:
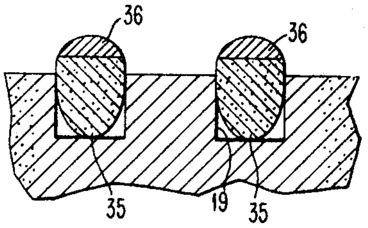
FIG. 4 is an enlarged sectional view of a portion of the non-monocrystalline substrate of FIG. 3 in which single crystal members have been grown.

Referring to FIG. 4, the substrate 15 is shown with separate silicon single crystal elements or members 35. The single crystal members 35 have been grown from the gold spheres 20 and have their upper portions 36 formed as a silicon-gold alloy.

Thus, growing of the single crystal members 35 ceases when the tops of the single crystal members 35 are above the top surface of the substrate 15. At this time, it is necessary to remove the portion 36 of each of the single crystal members 35 containing the silicon-gold alloy. The silicon-gold alloy may be removed by mechanical or chemical means. For example, abrasion could be employed if mechanical means were utilized. If chemical means were utilized, mercury might be employed to dissolve the gold through forming an amalgam with the gold.

Figure 5:
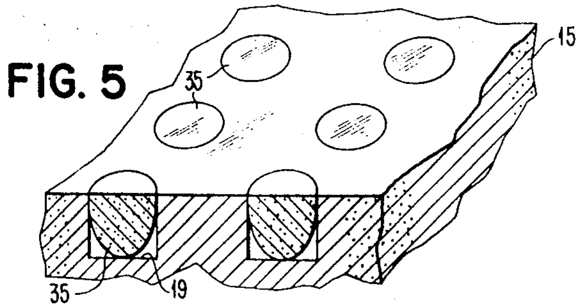
FIG. 5 is an enlarged perspective view, partly in section, of the non-monocrystalline substrate of FIGS. 3 and 4 with the silicon crystal members having their top surfaces in the same plane as the top surface of the non-monocrystalline substrate.

If it were desired that the top surface of the single crystal members 35 be in the same plane as the top surface of the substrate 15 as shown in FIG. 5, it would then be necessary to remove any of the silicon above the top surface of the substrate 15. This could be accomplished by polishing, for example. Of course, it is not necessary for the top surface of the single crystal members 35 to be in the same plane as the top surface of the substrate 15 to form integrated circuits therein.

In FIG. 5, the substrate 15 is shown with the portion of each of the single crystal members 35 above the top surface removed. The members 35 are formed only of single crystal silicon with a slight amount of gold therein as previously mentioned. With the top surface of each of the members 35 in the same plane as the top surface of the substrate 15, the various members 35 are electrically insulated from each other in the substrate 15 to form separate islands. Accordingly, the method of the present invention produces a product in which monolithic integrated circuits may be formed in each of the single crystal members 35, which are insulated from each other, in the substrate 15. That is, each of the single crystal members 35 will be capable of having a monolithic integrated circuit formed therein.

While gold was used in the examples suggested, any other metal having a lower melting temperature than the material from which the crystal is to be grown may be employed. However, the desirability of having gold in the silicon crystal for reducing carrier lifetime makes it most desirable.

While the example utilized the plug 18 of silicon as a heat drain member, it should be understood that the silicon crystals may be grown in the substrate 15 without the heat drain member. However, a much greater amount of applied heat from the heating element 23 is required to obtain the desired temperature gradient across the sphere 20.

Since the gold in the sphere 20 has a lower interfacial surface tension with the silicon passing thereover than the substrate 15 has with the silicon passing thereover in the tetrachlorosilane, regulation of the mole ratio of the tetrachlorosilane to the hydrogen insure that no silicon is formed on the substrate 15 from the tetrachlorosilane. Thus, the silicon is formed only on the sphere 20.

Accordingly, it is important that the material of the sphere 20 have a lower interfacial surface tension with the material from which the crystal is to be grown than the material of the substrate 15. Otherwise, the material might grow on the substrate 15 as well as on the sphere 20.

While the recess 19 has been described as being formed cylindrical, it should be understood that it could have other shapes such as conical or a frustrum of a cone, for example. With the recess 19 having a conical shape, there would be a greater possibility of polycrystals forming in the sphere 20 so that a more precise control of the parameters is required. Therefore, the conical shape recess is not as desirable as the cylindrical recess.

Of course, forming the recess 19 in the shape of a frustrum of a cone would be very desirable although the expense of forming the recess 19 in this shape is substantially greater than for a cylindrical recess. With the recess 19 having the shape of a frustrum of a cone, the nucleation will occur at the bottom of the sphere 20 and a tight fit may be formed between the sphere 20 and the wall of the recess 19 to insure that all silicon from the tetrachlorosilane must enter the sphere 20 at the top and none can enter the sphere 20 from the bottom.

While the gas from which the material is obtained for forming the crystals has been tetrachlorosilane, it should be understood that any silane could be employed. If the silane should be monosilane ($SiH_4$), then the hydrogen gas from the source 25 would not need to be employed. Instead, the helium gas from the source 29 could serve as the carrier gas of the monosilane since hydrogen is not needed to react with the monosilane to precipitate the silicon from the vapor.

Furthermore, other types of materials could be employed to grow crystals on the substrate 15. For example, germanium could be employed to grow crystals on the substrate 15 with the spheres 20 still formed of gold. The gas from which the germanium would be obtained would be a germane. One example of a germane could be tetrachlorogermane ($GeCl_4$).

Figures 6, 7, 8:
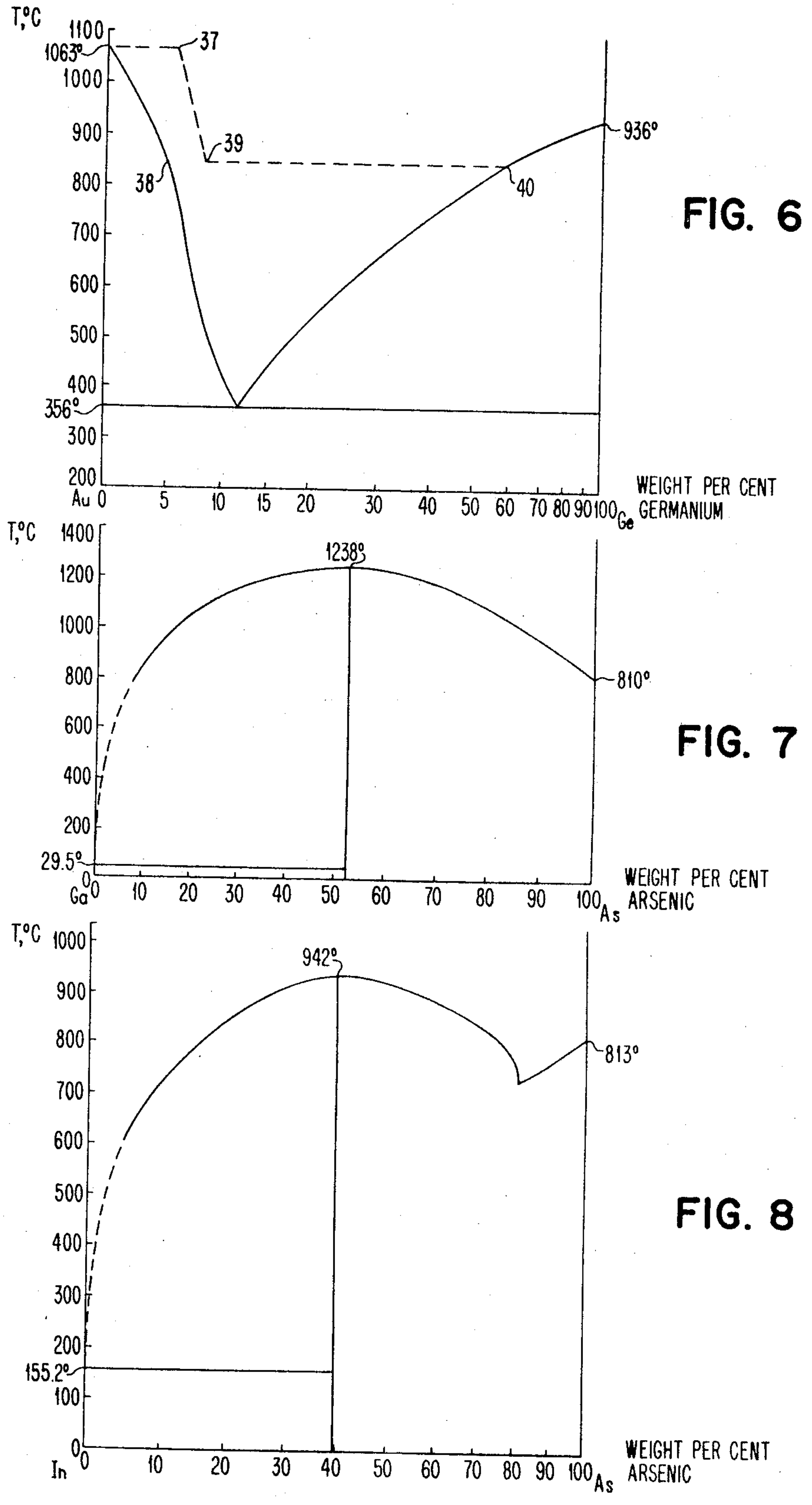
FIG. 6 is a phase diagram of the gold-germanium system.
FIG. 7 is a phase diagram of the arsenic-gallium system.

The phase diagram of gold and germanium is shown in FIG. 6. The points 37–40 of FIG. 6 correspond to points 31–34 in the phase diagram of FIG. 2 for gold and silicon. The same type of reactions occur as previously described for gold and silicon. As a result, single crystals of germanium are produced. It should be understood that the eutectic temperature is 356°C.

As previously mentioned, the spheres 20 could be formed of a material other than gold. For example, the sphere could be formed of gallium. The gas from which the metal would be obtained would be arsine ($AsH_3$). In this formation of the crystals, the single crystals would be the compound of gallium arsenide with arsenic being deposited into the sphere 20 from the arsine. The gallium arsenide is the equilibrium solid alloy formed on the arsenic rich side of the gallium rich eutectic.

As shown in FIG. 7, the gallium rich eutectic temperature is 29.5°C. If the temperature of the sphere 20 is maintained at 800°C, for example, nucleation will occur in the sphere. Since this temperature is above the melting point of gallium, the gallium spheres may be heated directly to this temperature with the arsine introduced directly at the same time. Accordingly, it is not necessary to heat the spheres 20 to a first temperature and then decrease the temperature of the spheres to a second and lower temperature as when depositing silicon or germanium in gold.

Accordingly, supersaturation occurs along the gallium liquidus line rather than along the arsenic liquidus line. As a result, the single crystals are formed of the compound of gallium arsenide on the arsenic rich side of the gallium rich eutectic. The phase diagram of arsenic and gallium is such that it is not feasible to produce only arsenic as the material of the single crystals.

It also should be understood that the sphere 20 could be formed of an element selected from the group consisting of boron, gallium, and indium with the material which is to be deposited into the liquid solution of the sphere 20 from the vapor selected from the group of phosphorous, arsenic, and antimony. The vapor from which the material is obtained for forming the crystals is a hydride or halide containing phosphorous, arsenic, or antimony. The hydride could be arsenic hydride ($AsH_3$) or phosphorous hydride ($PH_3$), for example. The halide could be arsenic trichloride ($AsCl_3$), arsenic tribromide ($AsBr_3$), arsenic triiodine ($AsI_3$), phosphorous trichloride ($PCl_3$), phosphorous tribromide ($PBr_3$), phosphorous triiodine ($PI_3$), or antimony trichloride ($SbCl_3$), for example.

When the single crystals are grown on the substrate 15 from any of the foregoing materials, the monocrystalline material is a compound of the materials of the sphere 20 and the metal that is deposited into the liquid solution of the sphere 20. Thus, the compound of the monocrystalline material could be gallium phosphide (GaP), gallium arsenide (GaAs), gallium antimonide (GaSb), indium phosphide (InP), indium arsenide (InAs), or indium antimonide (InSb), for example.

The phase diagram for two of these materials, arsenic and indium, as shown in FIG. 8. The eutectic temperature for this alloy is 155.2°C.

As described with respect to the gallium arsenide, single crystals would be formed of indium arsenide, which is the equilibrium solid alloy formed on the arsenic rich side of the indium righ eutectic. Again, as described with respect to the gallium arsenide, it is only necessary to select some temperature above the melting temperature of the indium. For example, if a temperature of 800°C were selected, it is not necessary to vary this temperature as was done for the gold-silicon and gold-germanium materials. The selection of a temperature such as 800°C will insure the formation of single crystals without any further change in the temperature by passing the vapor containing arsenic over the substrate 15.

Additionally, while the substrate 15 has been described as being formed of a dielectric material, it should be understood that it could be formed of a conductive material if it were desired to grow crystals therein.

While a temperature gradient has been applied across the sphere 20 to render it molten, it should be understood that the temperature gradient is not necessary across the sphere 20 when it is being rendered molten provided that the temperature at the bottom of the sphere 20 is no lower than the melting point of the material of the sphere 20. However, the temperature gradient must be applied during this initial stage if the temperature at the bottom of the sphere 20 is below the melting point of the material of the sphere 20.

The following examples are included to show methods that produced single crystal members in a polycrystalline substrate and methods that did not produce single crystal members in a polycrystalline substrate. These examples are not intended to place limitations on the scope of the invention not expressed in the claims.

Example I

A 25 mm. diameter reactor tube of quartz was disposed in a clamshell furnace, which was rewired to permit independent control of its upper and lower windings. A small auxiliary heater was constructed by winding Kanthal wire around a 3 inch long semi-cylindrical section of a quartz tube. This auxiliary heater was then placed directly on the reactor tube over the location of the substrate at the center of the clamshell furnace.

The clamshell furnace provided a background temperature of 800°C. The auxiliary heater was controlled to provide higher temperatures at the surface of a substrate from which the silicon was to be grown.

The reactor tube had a simple gas mixing manifold to introduce the desired atmospheres into the reactor tube. This manifold consisted of one line for the introduction of pure hydrogen or helium and a second line for the introduction of controlled partial pressures of tetrachlorosilane ($SiCl_4$) with the tetrachlorosilane contained in a saturator operating at about 24°C.

Prior to disposing any substrate within the reactor tube, a hydrogen stream was directed through the reactor tube at a rate of 1 liter per minute. By disposing a pair of platinum-platinum, 10 percent rhodium thermocouples one centimeter apart vertically in the reactor tube with the two thermocouples disposed on opposite sides of the centerline of the reactor tube and equal distances therefrom, the temperature difference between these two points was measured in this atmosphere of hydrogen. This provided a temperature gradient of 8°C between the two thermocouples when the temperature at the lower thermocouple was at 950°C.

A laminated polycrystalline substrate was mounted on a thick silicon slug, which functioned as a heat drain by placing the substrate very near to the upper surface of the reactor tube and close to the auxiliary heat surface. The slug was supported on a length of quartz tubing, which could be manipulated from outside of the reactor tube through a Beckman connector. A platinum-platinum, 10 percent rhodium thermocouple was mounted beneath the quartz holder to permit temperature measurement thereof.

The substrate, which was formed of a mixed oxide ceramic, was approximately 1 cm. square and 1 mm. thick. The substrate was specially fabricated with four cylindrical holes having a diameter of 0.012 inch and a depth of 0.005 inch to 0.010 inch with these holes located near the center of the substrate.

Gold spheres, which had a diameter of 0.010 inch, were disposed in each of the holes. The spheres were 99.99 percent pure gold.

The substrate, which contained the four gold spheres, was then heated in a hydrogen stream of 1 liter per minute, using both heaters, for 1 hours at a temperature (hereinafter referred to as a reference temperature) of 950°C as indicated by the thermocouple positioned under the quartz holder of the substrate. This position of the thermocouple is essentially the same as the position of the lower thermocouple when the temperature gradient of 8°C was measured.

The concentration of tetrachlorosilane was then introduced into the reactor tube and maintained at 0.05 mole percent for 30 minutes. The concentration of tetrachlorosilane was then increased to 2 mole percent for 2 hours. The reference temperature of 950°C was maintained during the entire process.

The resulting material, which was grown from each of the holes, was highly polycrystalline silicon rather than single crystal silicon.

Example II

All of the conditions and parameters of Example I were employed except that the reference temperature was 1,050°C and the temperature gradient was 16°C with the temperature at the lower thermocouple being 1,050°C. Again, as in Example I, the resulting material, which was grown from each of the holes, was highly polycrystalline silicon.

Example III

All of the conditions and parameters of Example I were employed except that the temperature gradient was approximately 100°C. In three of the four holes, single crystal silicon was grown. In the fourth hole, a three grained crystal silicon was grown.

Example IV

All of the conditions and parameters of Example I were employed except that the reference temperature was 1,050°C and the temperature gradient was approximately 100°C with the temperature at the lower thermocouple being 1,050°C. Single crystal silicon was grown in all four of the holes.

An advantage of this invention is that it eliminates the need for an additional step of electrically isolating integrated circuits from each other after formation thereof in a substrate. Another advantage of this invention is that it reduces the diffusivity of impurity atoms since it operates at lower temperatures than is presently required for epitaxial growth. A further advantage of this invention is that it eliminates the need for a single crystal substrate in which integrated circuits may be formed. Still another advantage of this invention is that the amount of silicon required is substantially reduced. A still further advantage of this invention is that the sphere and size of the substrate structure is not restricted in any manner.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for having a plurality of monolithic integrated semiconductor circuits formed therein, said device comprising:

a substrate selected from the group consisting of amorphous and polycrystalline material having a plurality of separate cylindrically shaped recesses therein;

substantially ovoid monocrystalline members each in eeach of said separate recesses, each of said members adapted to have a monolithic integrated circuit formed therein and making a high contact angle with the bottom of said recess.

2. The device according to claim 1 in which each of said monocrystalline members is formed of a material selected from the group consisting of silicon and germanium.

3. The device according to claim 1 in which each of said monocrystalline members is formed of a compound having one of its materials selected from the group consisting of boron, gallium, and indium and having the other of its materials selected from the group consisting of phosphorous, arsenic, and antimony.

4. A device as in claim 1 in which each of said monocrystalline members is formed of silicon having alloyed therewith approximately 0.0001 percent of gold.

* * * * *